Aug. 27, 1946.   L. A. DAHLE   2,406,531
COMBINATION SQUARE AND BEVEL
Filed March 14, 1945   2 Sheets-Sheet 1
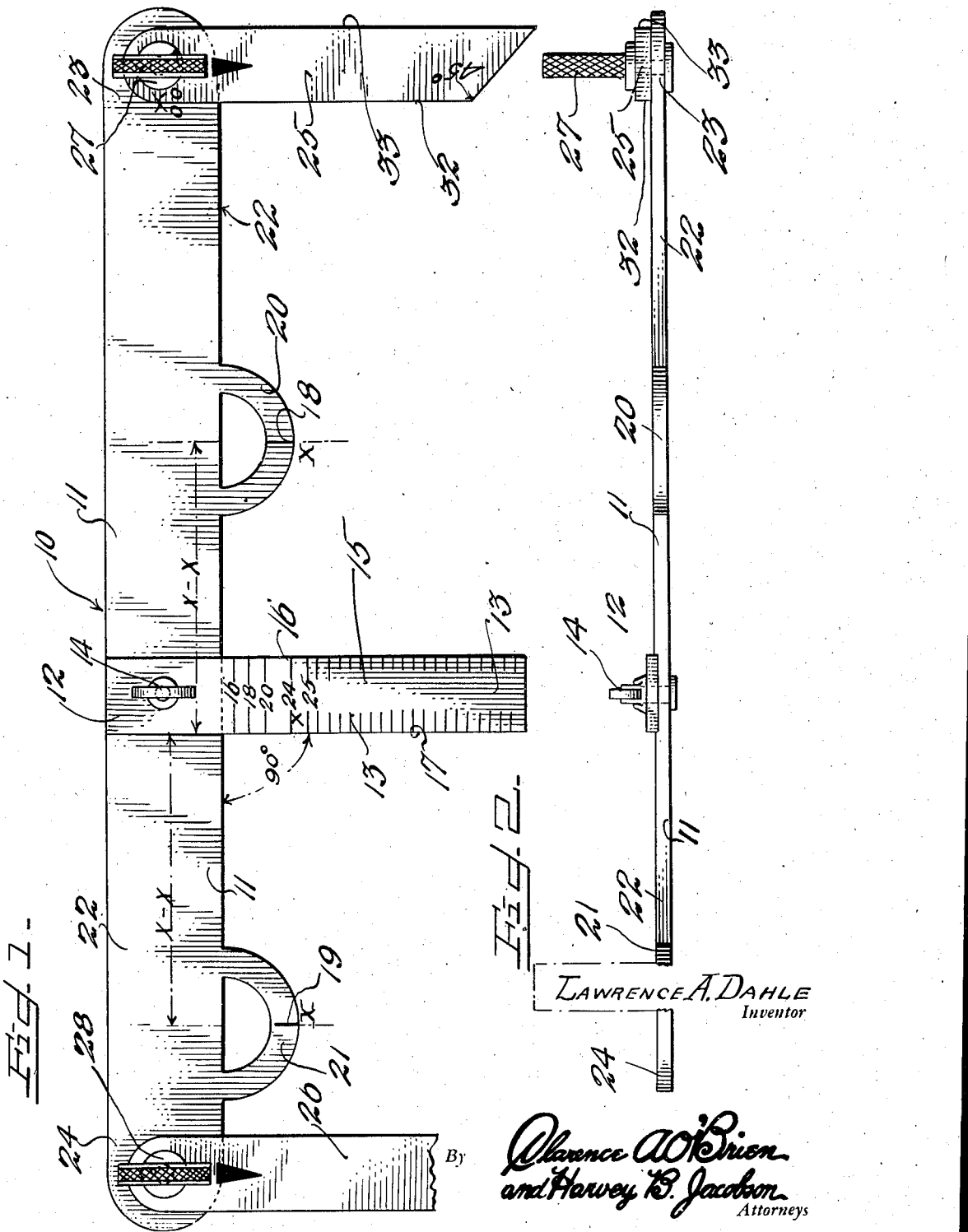
Lawrence A. Dahle
Inventor Aug. 27, 1946.   L. A. DAHLE   2,406,531
COMBINATION SQUARE AND BEVEL
Filed March 14, 1945   2 Sheets-Sheet 2
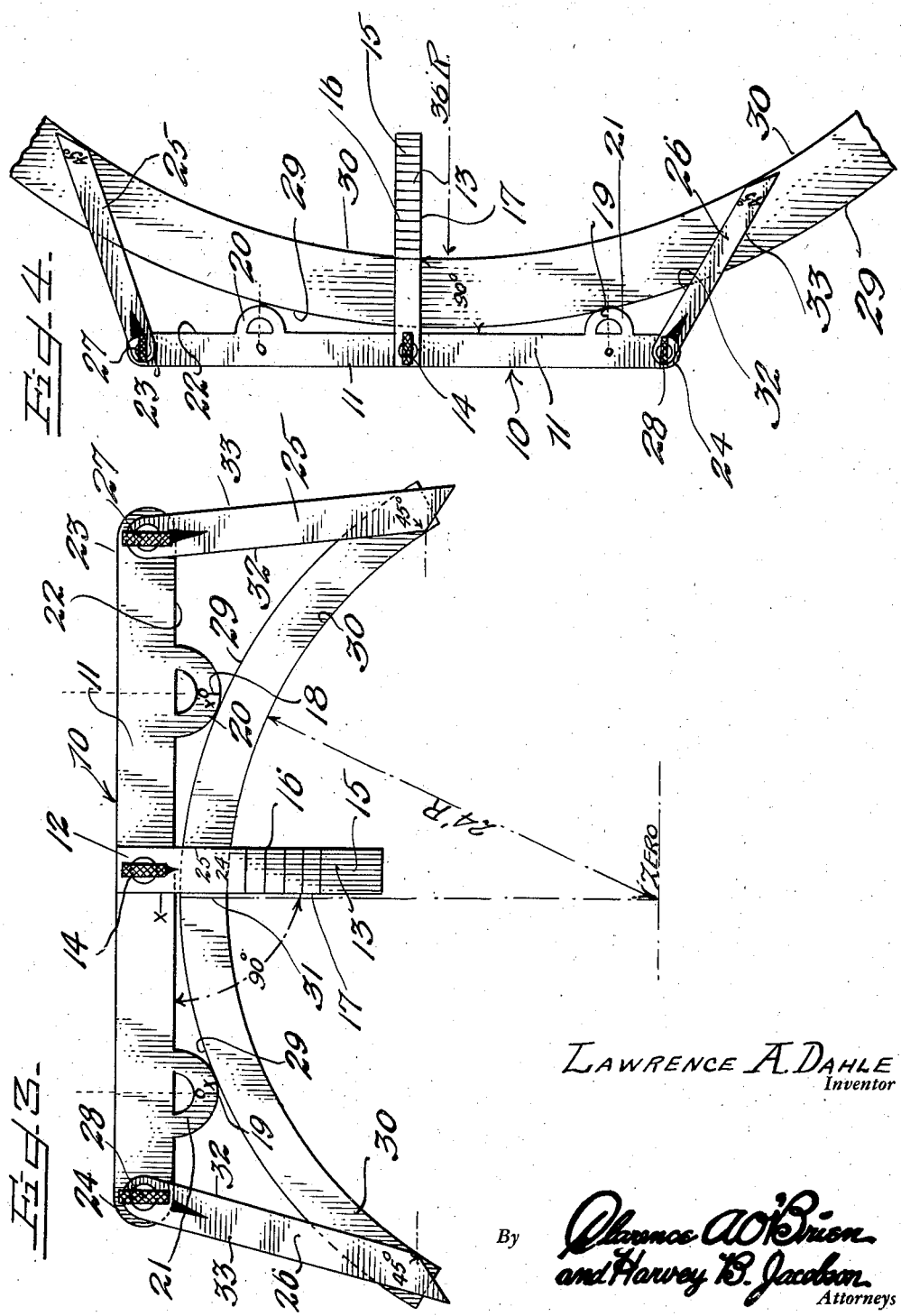
Lawrence A. Dahle
Inventor Patented Aug. 27, 1946

2,406,531

UNITED STATES PATENT OFFICE 2,406,531

COMBINATION SQUARE AND BEVEL

Lawrence A. Dahle, Marietta, Minn.

Application March 14, 1945, Serial No. 582,703

1 Claim. (Cl. 33—98)

This invention relates to mechanics' tools and has for its object to provide means for marking end cuts of sections for forming arcuate rafters or other circular work.

Another object of the invention is to provide a square by means of which end cut angles of arcuate members may be instantly determined.

A further object of the invention is to provide a square having spaced apart depending lobes to seat upon an arcuate member, a fixed tongue by means of which the degree of the arc may be determined and a pivoted arm for indicating how the bevel or splice end cut must be made for joining such members to continue the same arc.

Other features and advantages will become more readily apparent from the following description and the accompanying illustrative drawings in which:

Figure 1 is a plan view of my circle square,

Figure 2 is an edge view thereof,

Figure 3 is an elevational view showing the application of the invention and including a slight modification, and Figure 4 is a similar view indicating a different radius.

In the following specification and in the accompanying drawings like reference characters indicate like parts and in which 10, is a square so designed that the bevel end cuts of arcuate segments may be quickly scribed. My device consists of a straight body member 11, of flat metal into which is mortised one end 12, of a right angular arm 13, and held normally seated by means of a lock nut 14, when in working position, but which may be released to pivot upon the member 11, for storage purposes. The face 15, of said member 13, is marked off with lines 16, indicating various radius circles. The indiced edge 17, of this member is exactly centered between the degree marks 18 and 19, on the semicircular depending lobes or feet 20 and 21, which are integral with the member 11, and project from the edge 22, thereof and which are sufficiently spaced apart to seat upon arcuate surfaces of various degrees without permitting said edge 22, to come into contact therewith.

On both ends 23 and 24, of member 11, are pivoted bevel squares 25 and 26, respectively, which are adapted to be locked into adjusted position by means of the lock nut 27 and 28.

In the construction of buildings requiring arcuate rafters the general practice is to build them up of segments of one inch board cut in lengths applicable to form the required arc, and several layers must be secured together, the number of which depending upon the stress to be borne. For a three inch thick rafter there must be three layers of the length of the rafter, which requires a large number of segments to build up, necessitating considerable time in marking the two end cuts of each segment and which is often inaccurate under present methods, and which often results in weak structures. This expensive time element can be eliminated with the use of my above described tool, the use of which is extremely accurate as well as rapid, for in using the tool it is only necessary to seat the two members 20 and 21, upon the outer arcuate edge 29 of a segment 30, as indicated in Figures 3 and 4, then draw a line 31, across the edge of the segment along edge 17, of member 13, then shift the device to place either edge 32 or 33, of either or both members 25 and/or 26, into alignment with the line 31, then set the bevel squares to that exact angle and the tool is ready for use as the device may be placed at the ends of the segment and the bevel end cut scribed in accordance with either edge of the members 25 and 26. The bevel squares thus set are used continuously as long as the same arcuate segments are to be cut.

It is thought that persons skilled in the art to which the invention relates will be able to obtain a clear understanding of the invention after considering the description in connection wtih the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

A combined square and bevel comprising a straight edge body, a blade secured thereto at right angles and formed with a work edge and having circle radius indicia thereon in spaced relation, semi-circular positioning feet secured to the edge of said body at the opposite sides of said blade having positioning lines formed thereon parallel with and equidistant from said work edge, and pivoted bevel squares at the ends of said straight edge body adapted to be shifted to have a surface thereof alined with a mark drawn previously along the work edge of said blade when an arcuate piece of work material is contacted by said positioning feet, whereby the correct bevel or angle for the ends of the work material may be ascertained.

LAWRENCE A. DAHLE.